United States Patent
Ishii et al.

(10) Patent No.: US 8,462,711 B2
(45) Date of Patent: Jun. 11, 2013

(54) BASE STATION APPARATUS, USER APPARATUS, AND METHOD USED IN MOBILE COMMUNICATIONS SYSTEM

(75) Inventors: Hiroyuki Ishii, Yokosuka (JP);
Yoshihisa Kishiyama, Yokosuka (JP);
Kenichi Higuchi, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 392 days.

(21) Appl. No.: 12/531,635

(22) PCT Filed: Mar. 17, 2008

(86) PCT No.: PCT/JP2008/054873
§ 371 (c)(1),
(2), (4) Date: Dec. 3, 2009

(87) PCT Pub. No.: WO2008/123037
PCT Pub. Date: Oct. 16, 2008

(65) Prior Publication Data
US 2010/0103890 A1    Apr. 29, 2010

(30) Foreign Application Priority Data
Mar. 20, 2007 (JP) ................................. 2007-073731

(51) Int. Cl.
*H04W 4/00* (2009.01)
(52) U.S. Cl.
USPC .......................................... 370/329; 370/343
(58) Field of Classification Search
None
See application file for complete search history.

(56) References Cited

U.S. PATENT DOCUMENTS

| | | | | |
|---|---|---|---|---|
| 5,428,637 | A * | 6/1995 | Oliva et al. | 375/134 |
| 5,946,618 | A * | 8/1999 | Agre et al. | 455/428 |
| 6,816,555 | B2 * | 11/2004 | Sakoda | 375/260 |
| 7,236,452 | B2 * | 6/2007 | Maeda et al. | 370/210 |
| 7,295,606 | B2 * | 11/2007 | Paquelet | 375/238 |
| 8,032,146 | B2 * | 10/2011 | Zhu et al. | 455/450 |
| 2003/0123381 | A1 * | 7/2003 | Zhuang et al. | 370/208 |
| 2004/0141547 | A1 | 7/2004 | Paquelet | |
| 2005/0174954 | A1 * | 8/2005 | Yun et al. | 370/310 |
| 2005/0181758 | A1 * | 8/2005 | Ansamaa | 455/406 |
| 2007/0055990 | A1 * | 3/2007 | Seppala | 725/39 |
| 2009/0311987 | A1 * | 12/2009 | Edge et al. | 455/404.1 |
| 2010/0272004 | A1 * | 10/2010 | Maeda et al. | 370/312 |

FOREIGN PATENT DOCUMENTS

CN    1497863 A    5/2004

OTHER PUBLICATIONS

International Search Report w/translation from PCT/JP2008/054873 dated Jun. 17, 2008 (4 pages).
Written Opinion from PCT/JP2008/054873 dated Jun. 17, 2008 (3 pages).

(Continued)

*Primary Examiner* — Marsha D Banks Harold
*Assistant Examiner* — Hooman Houshmand
(74) *Attorney, Agent, or Firm* — Osha Liang LLP

(57) ABSTRACT

A base station apparatus in a mobile communications system which uses orthogonal frequency division multiplexing (OFDM) for downlink is disclosed. The base station includes a unit which generates a first signal; a unit which generates a second signal; a unit which multiplexes the first signal and the second signal to map the multiplexed signals to a sub-carrier to generate a transmit symbol; and a mapping determining unit which determines a position of mapping the second signal to the sub-carrier, wherein the mapping determining unit determines the mapping position based on a cell ID or cell group ID, and a mapping pattern defined with a sequence having two-stage structure.

7 Claims, 8 Drawing Sheets

$f_{hop}(j) = a(\lfloor ID_g / 6 \rfloor, j) + b(ID_g)$ where $ID_g$ : CELL GROUP ID $a(\lfloor ID_g / 6 \rfloor, j)$ : FUNCTION WHICH INCLUDES RANDOM SEQUENCE DETERMINES HOPPING PATTERN $b(ID_g) = ID_g \% 6$ : FUNCTION WHICH PERFORM A FIXED SHIFT ON $a(\lfloor ID_g / 6 \rfloor, j)$ DETERMINE AMOUNT OF FIXED SHIFT ON $a(\lfloor ID_g / 6 \rfloor, j)$

OTHER PUBLICATIONS

3GPP TSG RAN WG1 Meeting #48bis, R1-071641; "Frequency Hopping/Shifting of Downlink Reference Signal in E-UTRA"; NTT DoCoMo, Inc. et al.; St. Julians, Malta; Mar. 26-30, 2007 (3 pages).

3GPP TSG RAN WG1 Meeting #49; R1-072427; "Frequency Hopping/Shifting of Downlink Reference Signal in E-UTRA"; NTT DoCoMo, Inc. et al.; Kobe, Japan; May 7-11, 2007 (3 pages).

TSG RAN WG1 meeting #50, R1-073794; "Specification of cell-specific DL RS FH sequences"; Huawei; Athens, Greece; Aug. 20-24, 2007 (2 pages).

TSG RAN WG1 meeting #48, R1-070894; "Cell-specific integer sequences for frequency positioning of DL RS"; Huawei; St. Louis, Missouri, USA; Feb. 12-16, 2007 (2 pages).

3GPP TSG RAN WG1 LTE Ad Hoc, R1-060224; "Large sets of FH pilot patterns"; Huawei; Helsinki, Finland; Jan. 23-25, 2006 (8 pages).

TSG RAN WG1 meeting #47, R1-063032; "Frequency-shifting or frequency-hopping of DL reference symbols: implications to cell search and throughput performance"; Huawei; Riga Latvia; Nov. 6-10, 2006 (4 pages).

TSG RAN WG1 meeting #46bis, R1-062488. DL reference symbols with varying positions in frequency—system-level evaluation; Huawei; Seoul, Korea; Oct. 9-13, 2006 (4 pages).

3GPP TS 36.211 V0.3.1; "Physical Channels and Modulation"; Feb. 2007 (28 pages).

3GPP TR 25.814 V7.0.0; "Physical layer aspects for evolved Universal Terrestrial Radio Access (UTRA)"; Jun. 2006 (126 pages).

Chinese Office Action for Application No. 200880016307.3, mailed on Mar. 12, 2012 (13 pages).

esp@cenet Patent Abstract for Chinese Publication No. 1497863, publication date May 19, 2004. (2 pages).

Japanese Office Action for Application No. 2009-509024, mailed on Jun. 19, 2012 (8 pages).

Texas Instruments, "Summary of Reflector Discussions on EUTRA DL RS", 3GPP TSG RAN WG1 #47, R1-070265, Sorrento, Italy, Jan. 15-19, 2007.

Motorola, "Clarifications and Issues of Way Forward on DL RS", 3GPP TSG RAN WG1 Meeting #48, R1-070769, St. Louis, USA, Feb. 12-16, 2007.

* cited by examiner

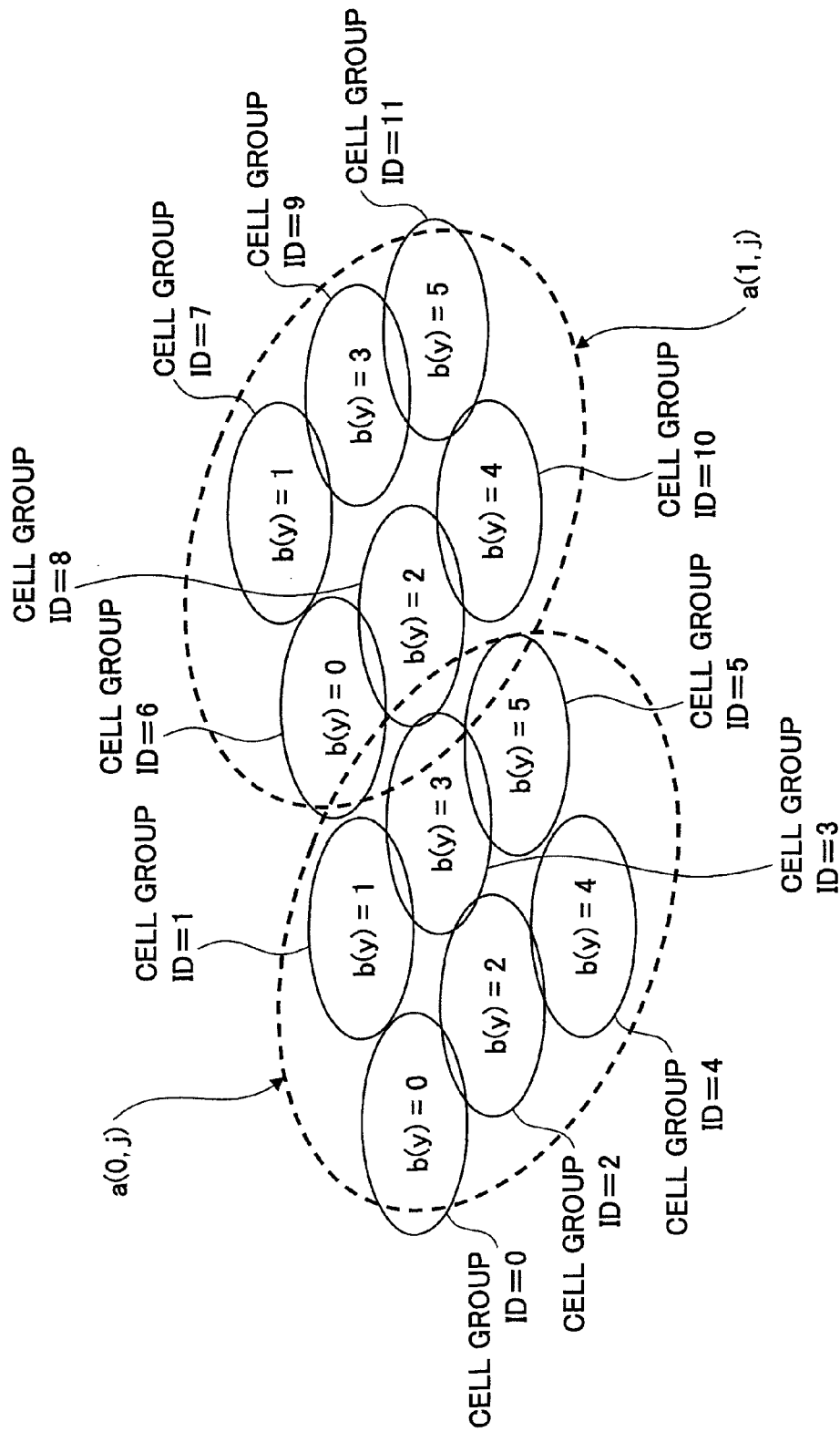

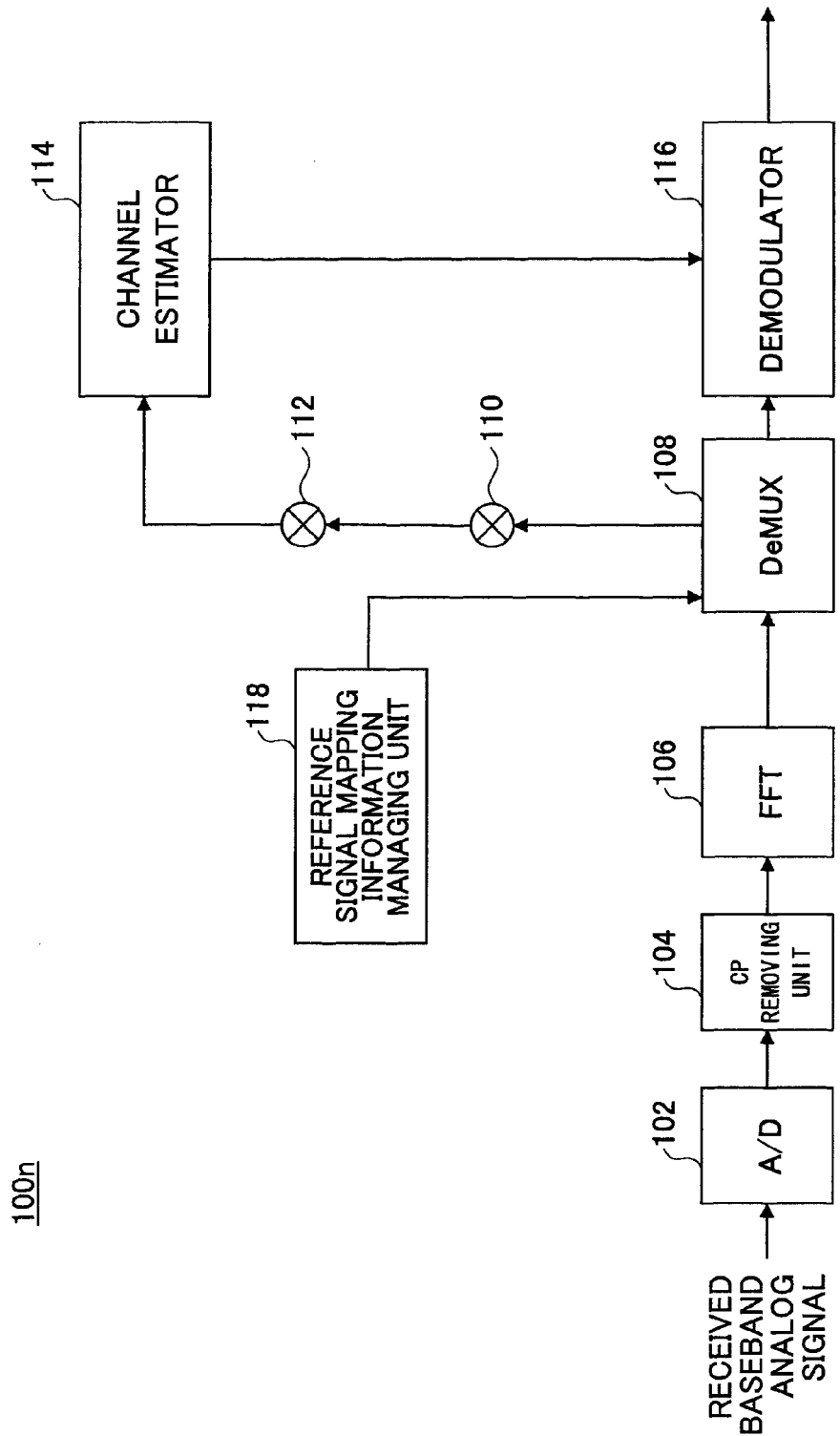

BASE STATION APPARATUS, USER APPARATUS, AND METHOD USED IN MOBILE COMMUNICATIONS SYSTEM

BACKGROUND OF THE INVENTION

1. Field of the Invention

The present invention generally relates to a mobile communications system which applies OFDM (Orthogonal Frequency Division Multiplexing) in downlink, and specifically relates to a base station apparatus, a user apparatus, and a method of mapping that effectively map a transmit signal to a sub-carrier.

2. Description of the Related Art

A communications scheme to succeed W-CDMA and HSDPA (i.e., LTE, or Long Term Evolution) is being considered by a W-CDMA standardization body 3GPP, and, as radio access schemes, OFDM for downlink and SC-FDMA (Single-Carrier Frequency Division Multiplexing) for uplink are being considered (see Non-patent document 1, for example).

OFDM is a scheme such that a frequency band is divided into multiple narrow frequency bands (sub-carriers) having data carried on the respective frequency bands to transmit the data, and the sub-carriers are densely lined up on the frequency bands without their interfering with one another while overlapping, which makes it possible to achieve high-speed transmission and improve the usage efficiency of the frequency.

SC-FDMA is a transmission scheme for dividing a frequency bandwidth, and transmitting using different frequency bands among multiple terminals to make it possible to reduce interference between terminals. SC-FDMA, which features a reduced variation in transmit power, makes it possible to achieve a wider coverage and reduced power consumption of a terminal.

In general, in mobile communications, there is a pilot signal for use in channel estimating and radio quality measuring, the pilot signal being called a downlink reference signal (DL RS) in LTE.

The downlink reference signal in LTE, which is expressed in a two-dimensional sequence, includes a two-dimensional orthogonal sequence and a two-dimensional pseudo random sequence. Mapping (a sub-carrier number) of a reference signal to a physical resource is expressed in the following equation (see Non-patent document 2, for example).

$$k = 6m + (v + f_{hop}(\lfloor i/2 \rfloor)) \bmod 6$$

$$l = \begin{cases} 0 & \text{if } n = 0 \text{ and } p = 0, 1 \\ 1 & \text{if } n = 0 \text{ and } p = 2, 3 \\ N_{symb}^{DL} - 3 & \text{if } n = 1 \end{cases}$$

Here, k represents a sub-carrier number, l represents an OFDM symbol number, and i represents a slot number. Moreover, $$N_{symb}^{DL} = 7$$

m and n take the following integer values.

$$m = 0, 1, \ldots, \left\lfloor \frac{N_{BW}^{DL}}{N_{BW}^{RB}/2} \right\rfloor - 1$$

$$n = \begin{cases} 0, 1 & \text{if } p = 0, 1 \\ 0 & \text{if } p = 2, 3 \text{ and the generic frame structure is used} \\ 0, 1 & \text{if } p = 2, 3 \text{ and the alternative frame structure is used} \end{cases}$$

$$N_{BW}^{RB} = 12$$

Here, $$N_{BW}^{DL},$$

which is a number of sub-carriers in a system bandwidth, is 300 when the system bandwidth is 5 MHz, 600 when the system bandwidth is 10 MHz, and 1200 when the system bandwidth is 20 MHz. Moreover, p, which represents an antenna port number, is p=0 when only one antenna is used, while values p=0, 1, 2, 3 may be taken when four antennas may be used.

In the first Equation, the value v may be determined according to the following Equation.

$$v = \begin{cases} 3n & \text{if } p = 0 \\ 3 + 3n & \text{if } p = 1 \\ 3(i \bmod 2) & \text{if } p = 2 \\ 3 + 3(i \bmod 2) & \text{if } p = 3 \end{cases}$$

Here, $f_{hop}(j)$, which is a cell-specific integer sequence, represents a hopping pattern which varies per sub-frame or slot of a downlink reference signal. In other words, varying $f_{hop}(j)$ per cell makes it possible to map, to a sub-carrier which varies per cell, the downlink reference signal. When the number of sub-frames in one radio frame is 10, the value of j becomes 0, 1, 2, ..., 9. In other words, $f_{hop}(j)$ becomes a sequence having ten elements.

$f_{hop}(j)$ may be set with a non-time-dependent fixed value. When such a fixed value is set per cell, the downlink reference signal is mapped with a shift by a fixed value which varies per cell.

FIGS. 1A and 1B show exemplary mappings of the reference signal. A mapping (FIG. 1A) to a physical resource with an antenna port number set to No. 0 (p=0) and an element of $f_{hop}(j)$ always set to 0, and a mapping (FIG. 1B) to the physical resource with the antenna port number set to No. 0 (p=0) and an element of $f_{hop}(j)$ always set to 2 are shown. As shown, in the former, in a first OFDM symbol (l=0), a downlink reference signal is mapped to the kth (where k=6×j (j: integer not less than 0) sub-carrier. However, in the latter, in the first OFDM symbol (l=0), the downlink reference signal is mapped to the kth (k=6×j+2 (j: integer not less than 0) sub-carrier. In FIGS. 1A and 1B, a case such that the number of OFDM symbols per slot is 6 is shown. A similar operation is applied with respect to a mapping operation based on the above-described $f_{hop}(j)$ when the number of OFDM symbols per slot is 7 instead.

In FIGS. 1A and 1B, two examples are shown of when an element of $f_{hop}(j)$ is set to be always 0 and when an element of $f_{hop}(j)$ is set to be always 2. However, in an actual mobile communications system, a very large number of cells exist, so that the sequence $f_{hop}(j)$ in the respective cells must be set to differ from one another. In this case, it is difficult to set the sequence $f_{hop}(j)$ in the respective cells to differ from one another just by setting the element of $f_{hop}(j)$ to always take a fixed value.

For example, associating a cell group ID with the sequence $f_{hop}(j)$ is proposed as a method of setting the sequence $f_{hop}(j)$ for the respective cells (see Non-patent document 3, for example). In this case, for a cell group ID of 0 to 5, each element of $f_{hop}(j)$ will always take a fixed value, while, for a cell group ID of 6 to 169, $f_{hop}(j)$ will vary in its value from element to element. Then, 170 sequences $f_{hop}(j)$ associated with the cell group IDs will be set to differ from one another. Each element of the sequence $f_{hop}(j)$ will have as many varying values as possible, but will have partially the same values.

Non-patent document 1: 3GPP TR 25.814 (V7.0.0), "Physical Layer Aspects for Evolved UTRA," June 2006

Non-patent document 2: 3GPP TR 36.211 (V0.3.1), "Physical Channels and Modulation," November 2006

Non-patent document 3: R1-070894, Cell-specific integer sequences for frequency positioning of DL RS, February, 2007

SUMMARY OF THE INVENTION

[Problem(s) to be Solved by the Invention]

As described above, cell-specific sequences $f_{hop}(j)$, which show a hopping pattern which varies per sub-frame or slot of a downlink reference signal, must be set to differ from one another.

In a method being proposed in Non-patent document 3, the cell-specific sequence $f_{hop}(j)$ is associated with a cell group ID, and includes six sequences with their elements always having a fixed value and 164 sequences with their elements having non-fixed values. Then, these 170 sequences $f_{hop}(j)$ are set such that they differ from one another.

However, in non-patent document 3, the 170 sequences $f_{hop}(j)$, while being defined such that the elements vary as much as possible, are not such that all of them differ. From the point of view of transmission characteristics, it is desirable that two neighboring cell sequences $f_{hop}(j)$ be completely different from each other, for example.

Then, the present invention aims to provide a base station apparatus, a user apparatus, and a method used therein, wherein two neighboring cell sequences $f_{hop}(j)$ are defined to differ from each other at a higher probability, and as a result, improved transmission characteristics may be achieved.

[Means for Solving the Problem]

In order to solve the problem as described above, according to the present invention, a mapping pattern sequence $f_{hop}(j)$ includes two-stage (two-layer) sequences, e.g., a first layer including a random hopping pattern, and a second layer including a shift pattern showing a fixed amount of shift.

More specifically, in a first aspect of the present invention, a base station apparatus in a mobile communications system which uses orthogonal frequency division multiplexing (OFDM) for downlink is provided. The base station apparatus includes:

a unit which generates a first signal;

a unit which generates a second signal;

a unit which multiplexes the first signal and the second signal to map the multiplexed signals to a sub-carrier to generate a transmit symbol; and a mapping determining unit which determines a position of mapping the second signal to the sub-carrier, wherein the mapping determining unit determines the mapping position based on a cell ID or cell group ID, and a mapping pattern defined with a sequence having a two-stage structure.

The first signal is, for instance, a data signal including user data or control data, and the second signal is, for instance, a reference signal.

The mapping pattern defined with the sequence having the two-stage structure is, for instance, defined by a first-layer sequence including a random hopping pattern and a second-layer sequence representing a shift having a fixed shift amount.

In a second aspect, a user apparatus in a mobile communications system which uses orthogonal frequency division multiplexing (OFDM) for downlink is provided. The user apparatus includes:

a unit which Fourier transforms a signal received from a base station apparatus, and derives a receive symbol;

a unit which separates a first signal and a second signal from the receive symbol;

a mapping information managing unit which determines information on mapping of the second signal on a sub-carrier, and supplies the mapping information to the separating unit; and a unit which makes channel estimation using the second signal, and demodulates the first signal, wherein the mapping information managing unit stores in advance a corresponding relationship between a cell ID or cell group ID and a mapping pattern defined in a two-stage sequence, detects the mapping pattern based on the cell ID of a cell in which the user apparatus is located or the cell group ID of a cell group to which the cell belongs, and supplies the detected mapping pattern to the separating unit.

In a third aspect, a method of mapping to a sub-carrier of a signal in a mobile communications system which uses orthogonal frequency division multiplexing (OFDM) for downlink is provided. The method includes the step of mapping, when a first signal and a second signal are multiplexed to map the multiplexed signals to the sub-carrier to generate a transmit symbol in a base station apparatus, the second signal to a sub-carrier position which is determined by a cell ID or cell group ID, and a mapping pattern defined in a two-stage sequence including a first sequence having a random hopping pattern and a second sequence having a shift with a fixed shift amount.

In a preferred embodiment, the mapping pattern is defined as a sum of a first function which is associated with the cell ID or cell group ID to define the random hopping pattern sequence, and a second function which is associated with the cell ID or the cell group ID to define the sequence of the shift pattern with the fixed shift amount.

ADVANTAGE OF THE INVENTION

The apparatus and method as described above make it possible to increase the probability such that mapping positions of reference signals of neighboring cells differ from one another, and, as a result, achieve downlink radio communications with good transmission characteristics.

BRIEF DESCRIPTION OF THE DRAWINGS

FIG. 6 is an example of a cell arrangement in the mobile communications system according to an embodiment of the present invention; and FIG. 7 is a schematic block diagram of a user apparatus according to an embodiment of the present invention.

DESCRIPTION OF THE PREFERRED EMBODIMENTS

[Description of Notations]

50 cell; 100$_1$, 100$_2$, 100$_3$, 100$_n$ user apparatuses; 102 analog digital converter (A/D); 104 CP removing unit; 106 fast Fourier transformer (FFT); 108 demultiplexer (DeMUX); 110 multiplier; 112 multiplier; 114 channel estimator; 116 demodulator; 118 reference signal mapping information managing unit; 200 base station apparatus; 202 data signal processor; 2021 MCS setting unit; 2022 encoder; 2023 data modulator; 2024 interleaver; 204 serial/parallel converter (S/P); 206 multiplexer (MUX); 208 inverse fast Fourier transformer (IFFT); 210 CP adding unit; 212 digital/analog converter (D/A); 214 reference signal generator; 2141 multiplier; 2142 multiplier; 216 reference signal mapping determining unit; 300 access gateway apparatus; 400 core network

[Best Mode of Carrying Out the Invention]

In the following, best modes for carrying out the invention are described based on the following embodiments with reference to the drawings. Throughout the drawings for explaining the embodiments, the same letters are used for those having the same functions, so that repetitive explanations are omitted.

Figure 1A:
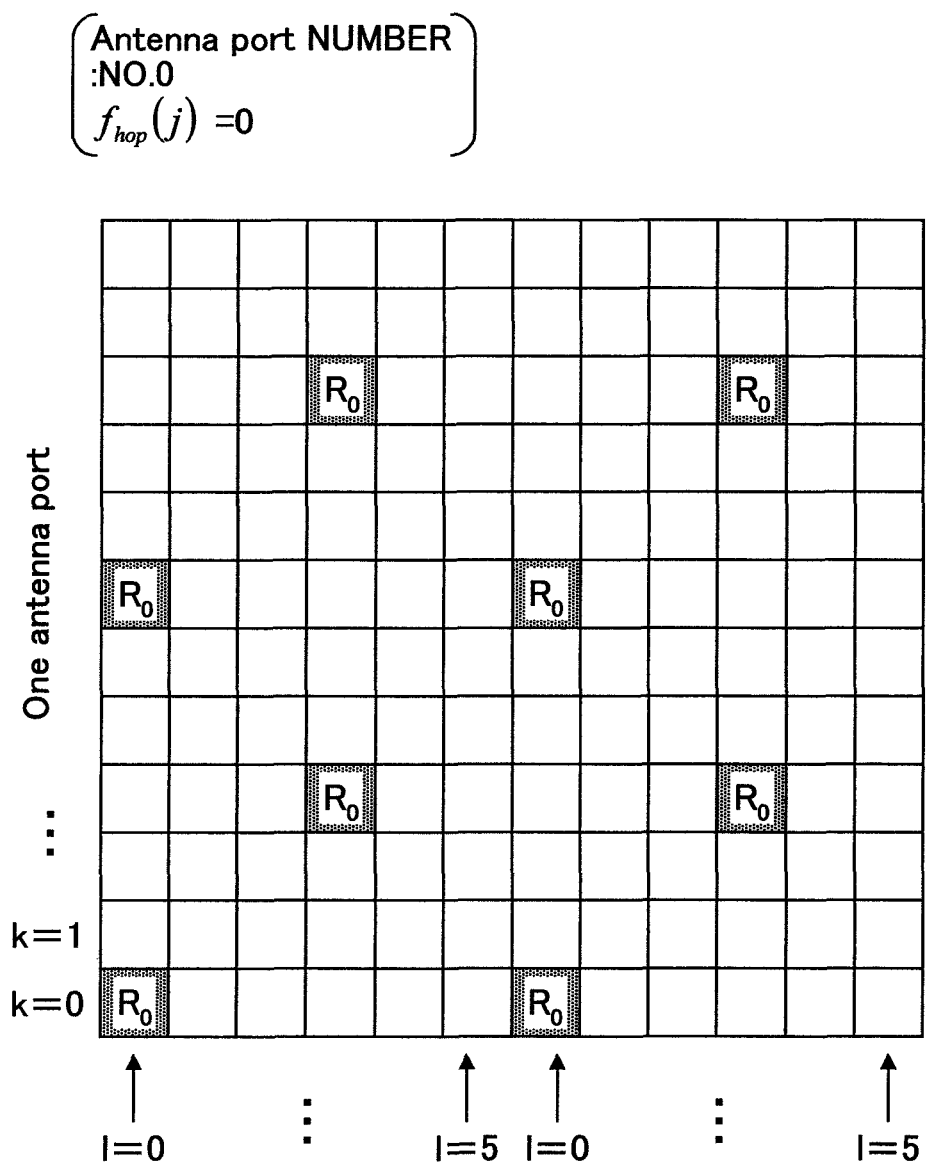
FIG. 1A is a diagram illustrating a mapping example of a downlink reference signal.
Figure 1B:
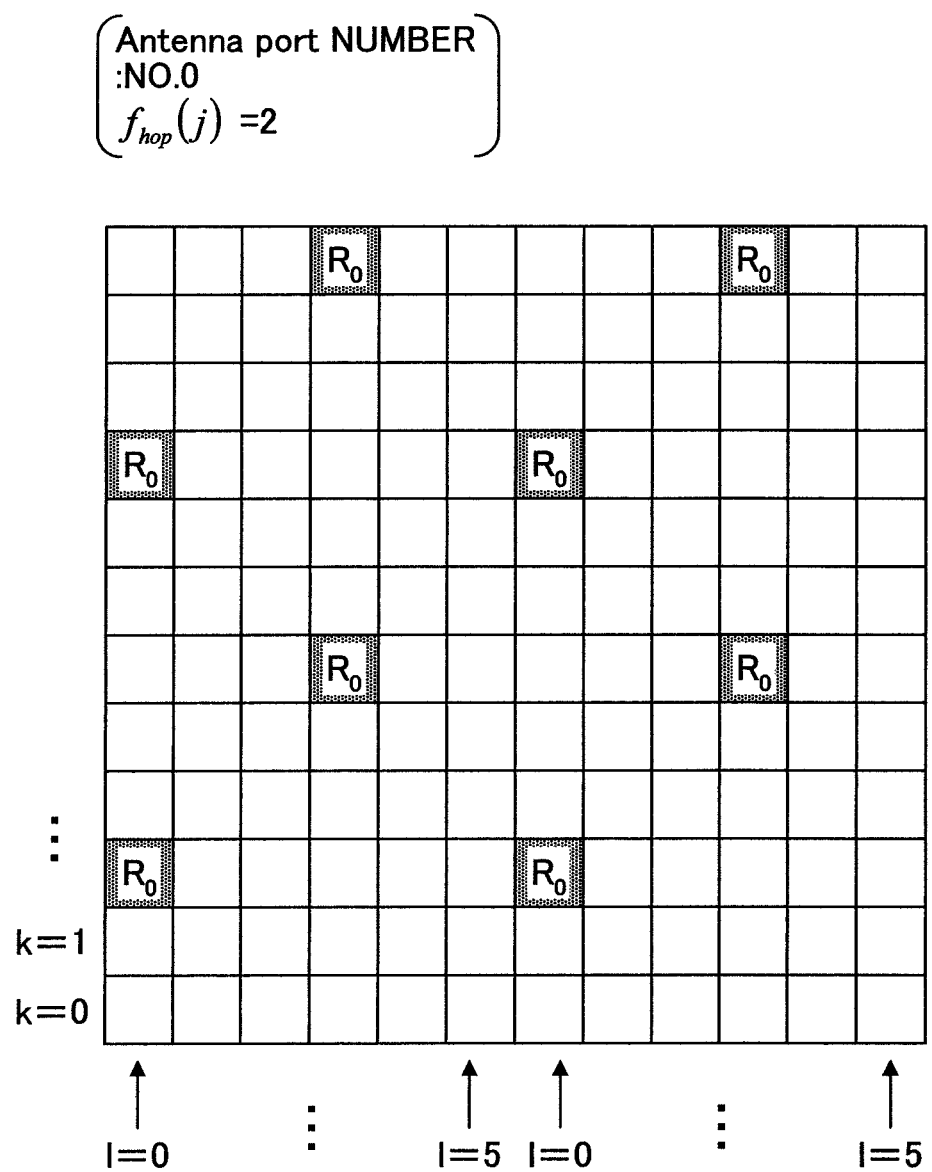
FIG. 1B is a diagram illustrating a mapping example of a downlink reference signal.
Figure 2:
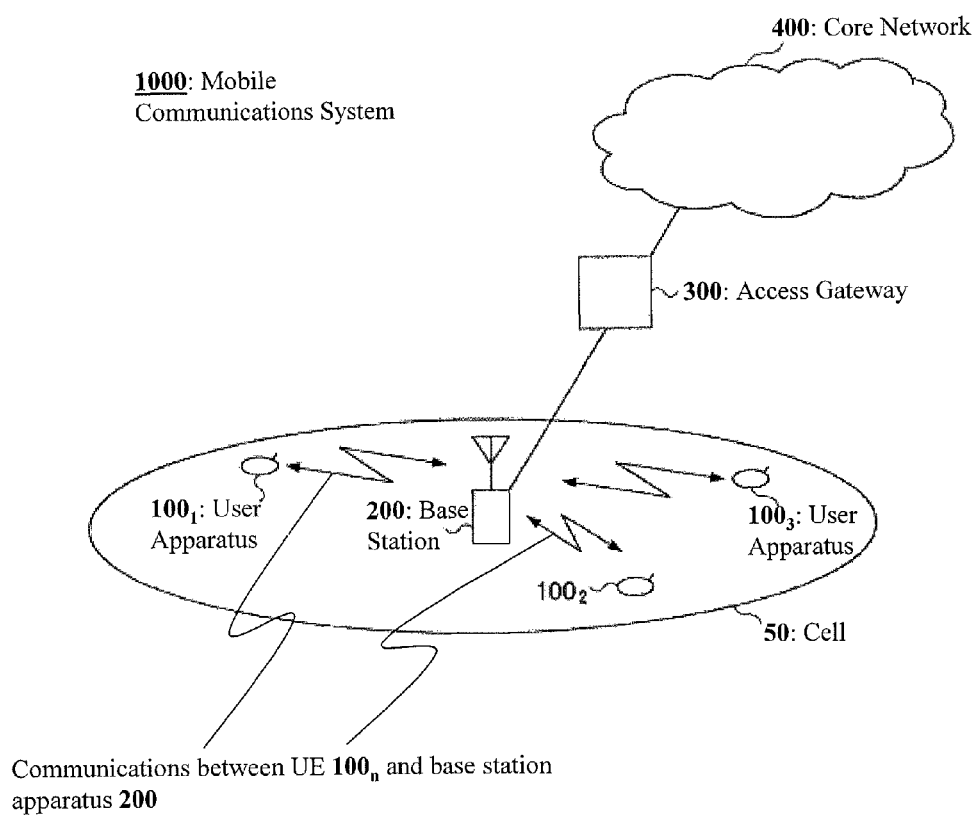
FIG. 2 is a block diagram illustrating a configuration of a mobile communications system according to an embodiment of the present invention.

With reference to FIG. 2, a mobile communications system is described to which a base station apparatus according to the embodiment of the present invention is applied.

A mobile communications system 1000, which is a system to which Evolved UTRA and UTRAN (otherwise known as Long Term Evolution or Super 3G) is applied for example, includes a base station apparatus (eNB: eNode B) 200 and multiple user apparatuses (UE: user equipment) 100$_n$ (100$_1$, 100$_2$, 100$_3$, ... 100$_n$, where n is an integer greater than 0). The base station 200 is connected to an upper station (for example, an access gateway apparatus 300), the access gateway apparatus 300 being connected to a core network 400. Here, the user apparatus 100$_n$ communicates in a cell 50 with the base station apparatus 200 by means of Evolved UTRA and UTRAN.

Each user apparatus (100$_1$, 100$_2$, 100$_3$, ... , 100$_n$) has the same configuration, function, and state, so that it will be referred to as the user apparatus 100n unless otherwise specified. For convenience of explanation, it is a user apparatus which communicates wirelessly with the base station apparatus, but more generally the user apparatus is to include a mobile terminal as well as a fixed terminal.

The mobile communications system 1000 may operate in multiple variable bandwidths. As an example, such variable bandwidths are provided as 5 MHz, 10 MHz and 20 MHz. A certain operator operates one or more of the variable bandwidths as system bandwidths, out of which system, the user may use one or more resource blocks (for example, 25 resource blocks are provided within a 5 MHz system bandwidth) to conduct communications.

As a radio access scheme, the mobile communications system 1000 uses OFDM (orthogonal frequency division multiplexing) for downlink and SC-FDMA (single-carrier frequency division multiple access) for uplink. As described above, OFDM is a scheme for dividing a frequency band into multiple narrow frequency bands (sub-carriers) and putting data on the respective frequency bands to transmit the data. SC-FDMA is a transmission scheme for dividing a frequency bandwidth, and transmitting using different frequency bands among multiple terminals to make it possible to reduce interference between terminals.

For downlink, a physical downlink shared channel (PDSCH: physical downlink shared channel) and a downlink control channel for LTE, which are used in a shared manner by the respective user apparatuses 100$_n$, are used. The downlink control channel for the LTE is called a physical downlink control channel (PDCCH). Moreover, the physical downlink control channel is also called a downlink L1/L2 control channel (DL L1/L2CCH). A downlink data signal is transmitted in the physical downlink shared channel. The data signal is called a downlink-shared channel as a transport channel.

For uplink, a physical uplink shared channel (PUSCH) for use on a shared basis among the respective user apparatuses 100$_n$ and an uplink control channel for LTE are used. There are two types of uplink control channels. One is a channel time-multiplexed to a physical uplink shared channel, and a frequency-multiplexed channel. The latter is transmitted in a dedicated band provided separately from the physical uplink shared channel. An uplink data signal is transmitted in the physical uplink shared channel. The data signal is called an uplink-shared channel as a transport channel.

In uplink, downlink quality information (CQI: channel quality indicator) and acknowledgment information (HARQ ACK information) of a physical downlink shared channel (downlink shared channel (Dl-SCH) as a transport channel) are transmitted. The downlink quality information (CQI) is also used in resource allocation (scheduling) of the physical downlink shared channel and determining a transport format in AMC (adaptive modulation and encoding).

Figure 3:
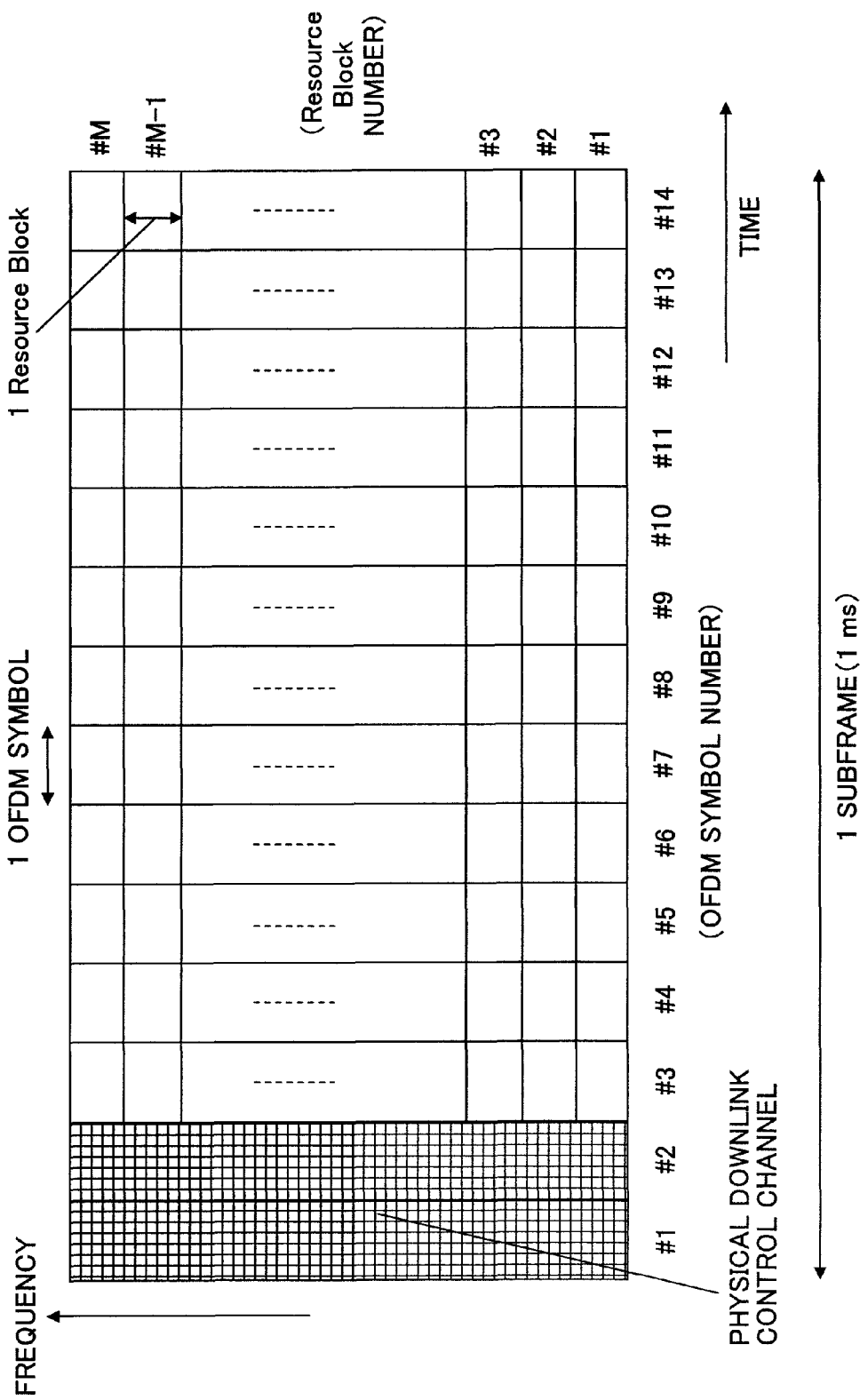
FIG. 3 is a diagram illustrating a configuration of a sub-frame.

FIG. 3 shows a configuration of a sub-frame in downlink. As shown, one sub-frame is 1 ms, for example, where, in one sub-frame, at least 14 OFDM symbols are included, for example. The physical downlink control channel is mapped to a number of OFDM symbols, starting from the beginning of one sub-frame. The maximum number of OFDM symbols to which a physical downlink control channel is mapped is 3. The physical downlink control channel is mapped in three types of methods of (1) mapping to an OFDM symbol #1; (2) mapping to OFDM symbols #1 and #2; and (3) mapping to OFDM symbols #1, #2, and #3. In the example in FIG., 3, a physical downlink control channel is mapped to two OFDM symbols (#1, #2) at the beginning of one sub-frame. Then, in an OFDM symbol to which a physical downlink control channel is not mapped, a data signal (a physical downlink shared channel PDSCH as a physical channel, DL-SCH as a transport channel) and a synchronization channel (a synchronization channel or synchronization signal, SCH), and broadcast channel (BCH) are transmitted. The broadcast channel may be called Physical BCH, for example.

Moreover, in the frequency direction, M resource blocks (RB: resource blocks) are provided. As an example, the frequency bandwidth per resource block is 180 KHz, so that 12 sub-carriers exist in one resource block. For convenience of explanation, a resource which takes up a bandwidth of a sub-carrier and a period of 1 OFDM symbol is called "a resource element". Moreover, the number M of resource blocks is 25 for a system bandwidth of 5 MHz, 50 for a systems bandwidth of 10 MHz, and 100 for a systems bandwidth of 20 MHz.

Figure 4:
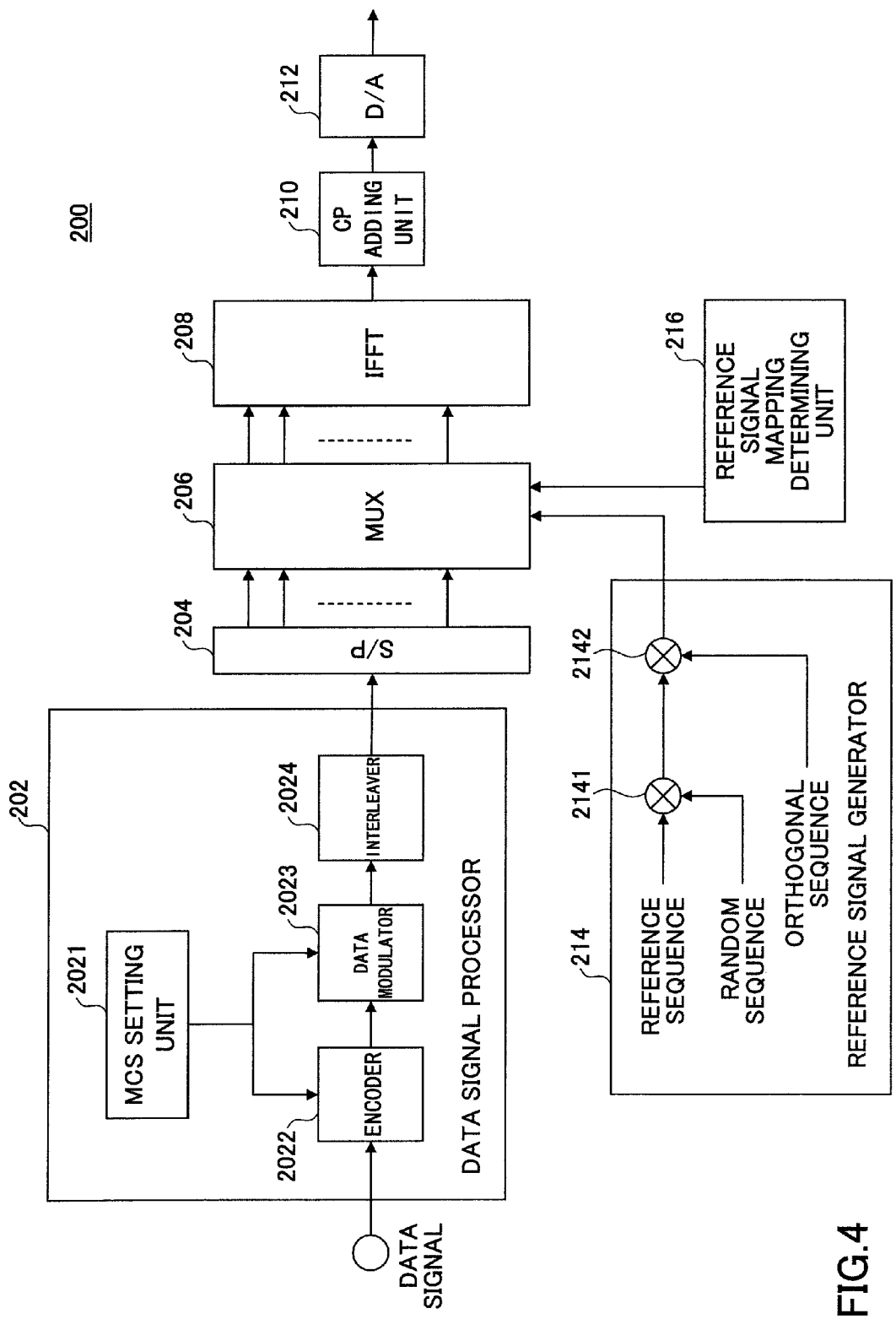
FIG. 4 is a schematic block diagram of a base station apparatus according to an embodiment of the present invention.
Figure 5:
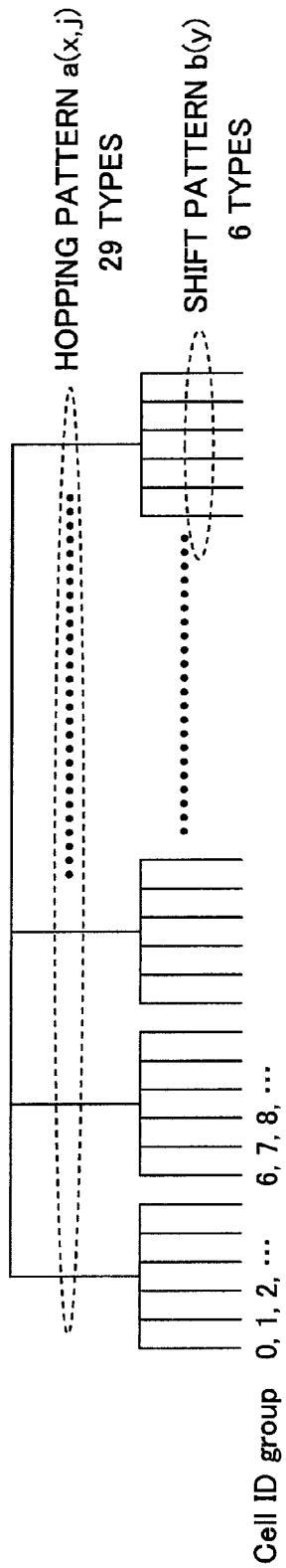
FIG. 5 is a conceptual diagram of $f_{hop}(j)$ according to an embodiment of the present invention.

FIG. 4 is a schematic block diagram of a base station apparatus 200 according to an embodiment of the present invention. The base station apparatus 200 has a data signal processor 202; a serial/parallel (S/P) converter 204; a multiplexer (MUX) 206; an inverse fast Fourier transformer (IFFT) 208, a cyclic prefix (CP) adding unit 210; a digital-to-analog converter (D/A) 212; a reference signal generator 214; and a reference signal mapping determining unit 216. The data signal processor 202 includes an MCS setting unit 2021, an encoder 2022, a data modulator 2023, and an interleaver 2024. The reference signal generator 214 has multipliers 2141 and 2142.

The data signal processor 202 performs processes related to a data signal destined for individual users.

The MCS setting unit 2021 instructs the respective processing elements to change, as needed, a combination of modulation scheme and the encoding rate that are used for the data signal. The combination of the modulation scheme and the encoding rate may be specified by a number (an MCS number), which indicates what the combination is.

The encoder 2022 performs channel encoding in order to increase the error tolerance of the data signal. Encoding may be performed using various schemes such as convolution encoding and Turbo encoding that are well known in the art. In the present embodiment, adaptive modulation and coding (AMC) control is performed on a data signal, with the channel encoding rate being adaptively changed according to an instruction from the MCS setting unit 2021.

The data modulator 2023 modulates the data signal using any appropriate modulation scheme such as QPSK, 16 QAM, or 64 QAM. In the present embodiment, AMC control is performed on the data signal, with the modulation scheme being adaptively changed according to an instruction from the MCS setting unit 2021.

The interleaver 2024 changes the order of bits included in the data signal according to a predetermined pattern. Alternatively, the interleaver 2024 may instead perform a process such that nothing is done, not performing the process of changing the order of bits as described above. In this case, the sequence of bits remains the same as in the original.

While FIG. 4 does not expressly show processing elements for the control channel, the same process as the data signal processor 202 is also performed for the control channel. AMC control does not need to be performed for the control channel.

The serial-to-parallel (S/P) converter 204 converts a serial signal sequence (stream) to parallel signal sequences. The number of parallel signal sequences may be determined in accordance with the number of sub-carriers.

The multiplexer (MUX) 206 multiplexes a data sequence indicating an output signal from the serial-parallel converter (S/P) 204, and a reference signal. The multiplexing may be performed by any one scheme of time multiplexing, frequency multiplexing, and time and frequency multiplexing. A broadcast channel may be multiplexed in addition to the above-described data sequence and the reference signal. Here, the multiplexer (MUX) 206 receives mapping information of the reference signal of the sub-frame from the reference signal mapping determining unit 216, and multiplexes the data sequence and the reference signal based on the mapping information. In other words, the multiplexer (MUX) 206 maps, to a sub-carrier, the above-described data sequence and reference signal based on the mapping information.

The fast inverse Fourier transformer (IFFT) 208 fast inverse Fourier transforms a signal input therein, and modulates the signal using OFDM.

The CP adding unit 210 adds a cyclic prefix (CP) to the OFDM-modulated symbol to create a transmit symbol. There are two types for the length of the CP (the CP length), namely a long CP, and a short CP, which length of the CP is used is selected per cell.

The digital-to-analog converter (D/A) 212 converts a base band digital signal to an analog signal.

The reference signal generator 214 multiplies, by a certain reference signal (for convenience, it is stated as the standard signal), a random code sequence, which is a first sequence, and then an orthogonal code sequence, which is a second sequence to provide a reference signal. How the reference signal is provided is disclosed in Non-patent document 2 (Section 5.6) In the above-described example, a random code sequence, which is a first sequence and an orthogonal sequence, which is a second sequence are multiplied. Alternatively, only the random code sequence, which is the first sequence, may be used in the multiplying.

The reference signal mapping determining unit 216 determines which sub-carrier the reference signal is mapped to in the sub-frame of the cell, and reports, to the multiplexer (MUX) 206, information on the mapping of the reference signal to the sub-carrier.

Below, details are shown of a method of determining the sub-carrier to which the reference signal is mapped in the reference signal mapping determining unit 216.

As described in the Related Art, the sub-carrier to which the downlink reference signal is mapped is determined by defining a cell-specific sequence $f_{hop}(j)$. j is an index representing a sub-frame in one radio frame. With one radio frame being 10 ms, the values of j=0, 1, 2, 3, 4, 5, 6, 7, 8, 9 may be taken.

The reference signal mapping determining unit 216 defines, as follows, a cell-specific sequence $f_{hop}(j)$, representing a hopping pattern per sub-frame.

$$f_{hop}(j) = a(\lfloor ID_g/6 \rfloor, j) + b(ID_g)$$

Here, $ID_g$ is a cell group ID. Function of a first $$a(\lfloor ID_g/6 \rfloor, j),$$

which is a random sequence with a cell group ID as an argument, determines a hopping pattern. Let the sequence represented by the function of the first term be a first layer of a two-stage structure (or two-layer structure). The number of cell group IDs is 170 and 0, 1, 2, ..., 169 are set as values of $ID_g$ so that with the function $$a(\lfloor ID_g/6 \rfloor, j)$$

29 types of hopping patterns may be defined. More specifically, in the function of the first layer, in $$a(\lfloor ID_g/6 \rfloor, j)$$

in $$a(0, j), a(1, j), \ldots, a(28, j)$$

29 types may be defined. For generating the function $$a(\lfloor ID_g/6 \rfloor, j)$$

it is desirable to set the function, taking into account the amount of hopping between temporally neighboring sub-frames. For example, the amount of hopping between temporally neighboring sub-frames may be limited to 0, 1, or 5. In other words, the amount of hopping between the sub-frames may be limited to not more than a predetermined threshold (in this case, no more than 1). The amount of hopping of 5 is substantially the same as the amount of hopping of 1 in the negative direction. Limiting in this way makes it possible to improve the channel estimation accuracy. Moreover, when generating the function $$a(\lfloor ID_g/6 \rfloor, j)$$

it is also desirable to take into account the amount of hopping between the last sub-frame of a certain radio frame and the first sub-frame of the following radio frame. For example, the amount of hopping between the last sub-frame of the certain radio frame and the first sub-frame of the following radio frame may also be limited to 0, 1, or 5. In other words, the amount of hopping between the last sub-frame of the certain radio frame and the first sub-frame of the following radio frame may be limited to not more than a predetermined threshold (in this case, not more than 1). Alternatively, the amount of hopping between temporally neighboring sub-frames may be limited to 2, 3, or 4. The values of 0, 1, 2, 3, 4, and 5 are values taking account that the eventual amount of hopping becomes a remainder from a division by 6. Thus, in actuality, a value no less than six may be defined. When a value not less than 6 is to be defined, it is also desirable to apply the above-described limitation with respect to the remainder when divided by 6.

The function $b(ID_g)$ in the second term performs a fixed shift on the function of the first term $$a(\lfloor ID_g/6 \rfloor, j),$$

which may be defined as $$b(ID_g) = ID_g \% 6,$$

for example. Here, A % B represents a remainder from a division of A by B. In other words, the function $b(ID_g)$ of the second term determines an amount of a fixed shift on the function of the first term.

$$a(\lfloor ID_g/6 \rfloor, j)$$

A sequence expressed in a function determining the fixed shift is set as a second layer sequence of the two-stage (two-layer) structure.

In this way, the position of a sub-carrier to which a reference signal is mapped is determined with a first function $a(x, j)$ and a second function $b(y)$ using a function $f_{hop}(x, j)$ which is expressed in hierarchical or tree structure. Then, based on information on mapping of the reference signal determined in the function $f_{hop}(j)$, the multiplexer (MUX) 206 maps, to a sub-carrier, a data signal and a reference signal.

More specifically, the following case is considered for the function $a(x, j)$, for example.

$a(0, 0) = 7$ $a(0, 1) = 4$ $a(0, 2) = 1$ $a(0, 3) = 7$ $a(0, 4) = 1$ $a(0, 5) = 5$ $a(0, 6) = 0$ $a(0, 7) = 4$ $a(0, 8) = 2$ $a(0, 9) = 2$

In this case, $f_{hop}(j)$ in a cell with the cell group ID of 0 will become as follows:

$f_{hop}(0) = 7 + 0 = 7$ $f_{hop}(1) = 4 + 0 = 4$ $f_{hop}(2) = 1 + 0 = 1$ $f_{hop}(3) = 7 + 0 = 7$ $f_{hop}(4) = 1 + 0 = 1$ $f_{hop}(5) = 5 + 0 = 5$ $f_{hop}(6) = 0 + 0 = 0$ $f_{hop}(7) = 4 + 0 = 4$ $f_{hop}(8) = 2 + 0 = 2$ $f_{hop}(9) = 2 + 0 = 2$ Moreover, $f_{hop}(j)$ in a cell with the cell group ID of 2 will become as follows:

$f_{hop}(0) = 7 + 2 = 9$ $f_{hop}(1) = 4 + 2 = 6$ $f_{hop}(2) = 1 + 2 = 3$ $f_{hop}(3) = 7 + 2 = 9$ $f_{hop}(4) = 1 + 2 = 3$ $f_{hop}(5) = 5 + 2 = 7$ $f_{hop}(6) = 0 + 2 = 2$ $f_{hop}(7) = 4 + 2 = 6$ $f_{hop}(8) = 2 + 2 = 4$ $f_{hop}(9) = 2 + 2 = 4$ As a result, $f_{hop}(j)$ in the cell with the cell group ID of 0 and $f_{hop}(j)$ in the cell with the cell group ID of 2 will be set such that the respective elements differ from each other. The same applies to a cell with the cell group ID of 0, 1, 2, 3, 4, or 5. In other words, $f_{hop}(j)$ in the cell with the cell group ID of 0: 1, 2, 3, 4 or 5 will be set such that the respective elements differ from each other.

Similarly, proceeding to define $a(1, j), a(2, j), \ldots, f_{hop}(j)$ in the cell with the cell group ID of 6: 7, 8, 9, 10 and 11 will be set such that the respective elements differ from each other and $f_{hop}(j)$ in the cell with the cell group ID of 12: 13, 14, 15, 16 and 17 will be set such that the respective elements differ from each other. Below, the same applies to cells with the cell group ID of up to 169.

Here, in the mobile communications system 1000, cells may be arranged such that cell groups have the same value of x in $a(x, j)$, which is a sequence for randomly determining a hopping pattern as shown in FIG. 6, for example. In FIG. 6, cell groups with x=0, in other words, cell groups with the cell group ID of 0, 1, 2, 3, 4, 5, or 6 are arranged such that one neighbors another. Moreover, cell groups with x=1, in other words, cell groups with the cell group ID of 6, 7, 8, 9, 10, or 11 are arranged such that one neighbors another. In this way, in the mobile communications system 1000, cell groups having the same sequence $a(x, j)$ for a first layer that determines a hopping pattern may be arranged such that one neighbors another.

Arranging cell groups having the same $a(x, j)$ which determines a hopping pattern such that one neighbors another makes it possible to reduce the probability of the reference signal colliding between neighboring cells, leading to an improved transmission characteristics.

FIG. 7 is a schematic block diagram of a user apparatus $100_n$ according to an embodiment of the present invention. The user apparatus 100n includes an analog-digital converter (A/D) 102, a CP removing unit 104, a fast Fourier transformer (FFT) 106, a demultiplexer (DeMUX) 108, a multiplier 110, a multiplier 112, a channel estimator 114, a demodulator 116, and a reference signal mapping information managing unit 118.

The analog-digital converter (A/D) 102 converts a received analog signal to a base band digital signal.

The CP removing unit 104 removes a CP from a received symbol, and keeps effective symbol portions.

The fast Fourier transformer (FFT) 106 fast Fourier transforms a signal input, and demodulates the signal using OFDM.

The demultiplexer (DeMUX) 108 separates a reference signal and a data signal (user data or control data) from the received signal. Here, the demultiplexer (DeMUX) 108 receives, from the reference signal mapping information managing unit 118, information on which sub-carrier a reference signal is mapped to in the sub-frame, and separates, from the received signal, the reference signal and a data signal (user data or control data) based on the information.

The multipliers 110 and 112 multiply, by the reference signal, a random code sequence, which is a first sequence, and then an orthogonal code sequence, which is a second sequence. In the above-described example, a random code sequence, which is a first sequence and an orthogonal sequence, which is a second sequence are multiplied. Alternatively, only the random code sequence, which is the first sequence, may be used in the multiplying.

The channel estimator 114 performs channel estimation based on the reference signal, and determines what channel compensation is to be performed on a received data signal.

The demodulator 116 compensates the data signal based on the channel estimation results, and reconstructs a data signal transmitted from the base station apparatus 200.

In the reference signal mapping information managing unit 118, information indicating the relationship between the cell group ID and $f_{hop}(j)$, which is a cell-specific sequence, is obtained in advance. Then, the reference signal mapping information managing unit 118 obtains $f_{hop}(j)$ based on a communications area provided by the base station apparatus 200 with which own station is communicating with, or in other words, an ID of a cell group to which a cell belongs. Details of $f_{hop}(j)$ are omitted as they are the same as the explanation on the above-described reference signal mapping determining unit 216. The reference signal mapping information managing unit 118 obtains $f_{hop}(j)$ based on the cell group ID, generates information, on what sub-carrier the reference signal is mapped to in the sub-frame based on the above-described $f_{hop}(j)$, and reports the information to the demultiplexer (DeMUX) 108.

In the above-described example, the sub-carrier to which the reference signal is mapped is determined based on a sequence with a two-stage structure, but a cell ID may be used in lieu of the cell group ID. In other words, the sub-carrier to which the reference signal is mapped may be determined based on the cell ID and the sequence with the two-stage structure.

In the above-described embodiment, an example has been described of a system to which Evolved UTRA and UTRAN (otherwise known as Long Term Evolution, or Super 3G) are applied. However, the base station apparatus, user apparatus and method according to the present invention may be applied to all systems using OFDM in downlink.

Thus, according to one embodiment of the present invention, defining 170 sequences $f_{hop}(j)$ as sequences having two-layer structures, and setting sequences $f_{hop}(j)$ for two neighboring cells such that they differ from each other at a higher probability make it possible to achieve downlink radio communications with good transmission characteristics.

The present application claims priority based on Japanese Patent Application No. 2007-073731 filed on Mar. 20, 2007 with the Japanese Patent Office, the entire contents of which are hereby incorporated herein by reference.

The invention claimed is:

1. A base station apparatus in a mobile communications system which uses orthogonal frequency division multiplexing (OFDM) for downlink, comprising:
   a unit which generates a first signal;
   a unit which generates a second signal;
   a unit which multiplexes the first signal and the second signal and maps the multiplexed signals to a sub-carrier to generate a transmit symbol;
   a mapping determining unit which determines a position of mapping the second signal to the sub-carrier, wherein the mapping determining unit determines the mapping position based on a cell ID or cell group ID, and a mapping pattern defined with a sequence $f_{hop}(j)$ having a two-stage structure; and
   wherein the mapping pattern defined with the sequence having the two-stage structure is defined by $f_{hop}(j)=a(x,j)+b(ID)$, wherein ID is the cell group ID or the cell ID, $a(x,j)$ is a first-stage sequence including a random hopping pattern having arguments x and j, wherein x=floor(ID/6) and j is an integer from 0 to 9, and wherein $b(ID)=ID \% 6$ is a second-stage sequence representing a fixed shift to the first-stage sequence $a(x,j)$, and
   wherein the cell or cell group having the same hopping pattern is arranged in a neighboring manner in the first sequence.

2. The base station apparatus as claimed in claim 1, wherein
   the first signal is a data signal including user data or control data, and the second signal is a reference signal.

3. The base station apparatus as claimed in claim 1, wherein
   the random hopping pattern has an amount of hopping between sub-frames that is not more than a predetermined threshold value.

4. A user apparatus in a mobile communications system which uses orthogonal frequency division multiplexing (OFDM) for downlink, comprising:
   a unit which Fourier transforms a signal received from a base station apparatus, and derives a receive symbol;
   a separating unit which separates a first signal and a second signal from the receive symbol;
   a mapping information managing unit which determines information on mapping of the second signal on a sub-carrier, and supplies the mapping information to the separating unit; and
   a unit which makes channel estimation using the second signal, and demodulates the first signal, wherein
   the mapping information managing unit stores in advance a corresponding relationship between a cell ID or cell group ID and a mapping pattern defined with a sequence $f_{hop}(j)$ having a two-stage sequence defined by a first-stage sequence including a random hopping pattern and a second-stage sequence representing a shift having a fixed amount of shift, and the mapping information managing unit detects the mapping pattern based on the cell ID of a cell in which the user apparatus is located or the cell group ID of a cell group to which the cell belongs, and supplies the detected mapping pattern to the separating unit, the mapping pattern defined in the two-stage sequence is $f_{hop}(j)=a(x,j)+b(ID)$, wherein ID is the cell group ID or the cell ID, $a(x,j)$ is a first-stage sequence including a random hopping pattern having arguments x and j, wherein x=floor ID/6) and j is an integer from 0 to 9, and wherein $b(ID)=ID \% 6$ is a second-stage sequence representing a fixed shift to the first-stage sequence $a(x,j)$, and the cell or cell group having the same hopping pattern is arranged in a neighboring manner in the first sequence.

5. The user apparatus as claimed in claim 4, wherein the first signal is a data signal including user data or control data, and the second signal is a reference signal.

6. The user apparatus as claimed in claim 4, wherein the random hopping pattern has an amount of hopping between sub-frames that is not more than a predetermined threshold value.

7. A method of mapping to a sub-carrier of a signal in a mobile communications system which uses orthogonal frequency division multiplexing (OFDM) for downlink, comprising the step of mapping, when a first signal and a second signal are multiplexed, the multiplexed signals to the sub-carrier to generate a transmit symbol in a base station apparatus, the second signal to a sub-carrier position which is determined by a cell ID or cell group ID, and a mapping pattern defined in a two-stage sequence including a first-stage sequence having a random hopping pattern and a second-stage sequence having a shift with a fixed shift amount, wherein the mapping pattern is $f_{hop}(j)=a(x,j)+b(ID)$, wherein ID is the cell group ID or the cell ID, $a(x,j)$ is the first-stage sequence including a random hopping pattern having arguments x and j, wherein x=floor(ID/6) and j is an integer from 0 to 9, and wherein $b(ID)=ID \% 6$ is the second-stage sequence representing a fixed shift to the first-stage sequence $a(x,j)$, and wherein the cell or cell group having the same hopping pattern is arranged in a neighboring manner in the first sequence.

* * * * *